United States Patent
Dubois et al.

(10) Patent No.: US 11,903,380 B2
(45) Date of Patent: Feb. 20, 2024

(54) AQUEOUS COMPOSITION BASED ON POLYOXYMETHYLENE DIALKYL ETHERS (POM) AND THEIR USE FOR THE PRESERVATION AND/OR EMBALMING OF THE HUMAN OR ANIMAL BODY

(71) Applicant: ARKEMA FRANCE, Colombes (FR)

(72) Inventors: Jean-Luc Dubois, Colombes (FR); Jean-Luc Couturier, Pierre-Benite (FR); Didier Belluard, Sarcey (FR); Christian Haroux, Brindas (FR)

(73) Assignee: ARKEMA FRANCE, Colombes (FR)

(*) Notice: Subject to any disclaimer, the term of this patent is extended or adjusted under 35 U.S.C. 154(b) by 608 days.

(21) Appl. No.: 16/831,136

(22) Filed: Mar. 26, 2020

(65) Prior Publication Data
US 2020/0315161 A1  Oct. 8, 2020

(30) Foreign Application Priority Data
Mar. 28, 2019 (FR) ...................... 1903221

(51) Int. Cl.
*A01N 1/00* (2006.01)
*A01N 31/02* (2006.01)
*A01N 33/12* (2006.01)
*A01N 35/04* (2006.01)
*A01N 43/36* (2006.01)
*A01N 25/02* (2006.01)

(52) U.S. Cl.
CPC .............. *A01N 1/00* (2013.01); *A01N 31/02* (2013.01); *A01N 33/12* (2013.01); *A01N 35/04* (2013.01); *A01N 43/36* (2013.01); *A01N 25/02* (2013.01)

(58) Field of Classification Search
None
See application file for complete search history.

(56) References Cited

U.S. PATENT DOCUMENTS

| 3,207,727 | A  | * | 9/1965 | Fujii | C08G 2/26 525/401 |
| 3,310,608 | A  | * | 3/1967 | Matsubayashi | C08F 8/48 525/61 |
| 9,266,990 | B2 | * | 2/2016 | Wang | C08G 2/34 |
| 2008/0166315 | A1 | * | 7/2008 | DuBois | A01N 31/02 424/75 |
| 2008/0207954 | A1 | * | 8/2008 | Stroefer | C07C 41/48 568/600 |
| 2010/0145079 | A1 | * | 6/2010 | Stroefer | C07D 323/06 549/368 |
| 2011/0104097 | A1 | * | 5/2011 | Dubois | A01N 1/00 424/75 |
| 2012/0020910 | A1 | * | 1/2012 | Sigoure | A01N 31/02 424/75 |
| 2020/0305414 | A1 | * | 10/2020 | Dubois | A01N 43/36 |

FOREIGN PATENT DOCUMENTS

| CN | 106518641 A | 3/2017 |
| CN | 106588590 A | 4/2017 |
| CN | 105753666 A | 7/2017 |
| CN | 206337195 U | 7/2017 |
| CN | 107286001 A | 10/2017 |
| CN | 109053394 A | 12/2018 |
| CN | 109096062 A | 12/2018 |
| CN | 109096065 A | 12/2018 |
| EP | 1938684 A1 | 7/2008 |
| GB | 603872 A | 6/1948 |
| WO | 2010/001048 A2 | 1/2010 |
| WO | 2010/116075 A2 | 10/2010 |

OTHER PUBLICATIONS

European Search Report dated Jun. 20, 2022 for European Patent Application No. 20165959.6 (8 pages in French with translation).
Office Action dated Feb. 28, 2020 for U.S. Appl. No. 16/386,584 (16 pages).
European Communication dated Nov. 21, 2021 for European Patent Application No. 20165959.6 (6 pages in French with machine translation).
European search report dated Jun. 22, 2020 for European Patent Application No. 20165959.6 (8 pages in French with Translation).

* cited by examiner

*Primary Examiner* — John J Figueroa
(74) *Attorney, Agent, or Firm* — Smith, Gambrell & Russell, LLP

(57) ABSTRACT

The invention relates to a mixture of polyoxymethylene dialkyl ethers (POM) having a specific molecular distribution of n as well as its preparation method.
The invention also relates to a composition comprising:
a) a mixture of polyoxymethylene dialkyl ethers (POM) having a restricted specific molecular distribution
b) at least one biocidal agent
c) at least one pro-penetrating agent
d) at least one dye
e) optionally, another additive
and water as diluent,
It also relates to a non-therapeutic method of preserving and/or embalming a dead human or animal body using the composition, such as the use of this composition for anatomopathological purposes.

16 Claims, No Drawings

AQUEOUS COMPOSITION BASED ON POLYOXYMETHYLENE DIALKYL ETHERS (POM) AND THEIR USE FOR THE PRESERVATION AND/OR EMBALMING OF THE HUMAN OR ANIMAL BODY

The present invention relates to a mixture of polyoxymethylene dialkyl ethers of general structure R—$(OCH_2)_n$—OR', also called POM, having a restricted specific molecular distribution of n, its method of preparation as well as an aqueous composition or formulation for the preservation of the dead human or animal body and/or for the embalming of said body, comprising said mixture of POM, a biocidal agent, a pro-penetrating agent, a dye, optionally another additive, and water as a diluent. It also relates to a non-therapeutic method using the composition for the preservation of the dead human or animal body and/or for the embalming of the body.

EP1938684 A1 already describes the non-therapeutic use of a composition comprising I) polyoxymethylene dialkyl ethers (POM) R—$(OCH_2)_n$OR' with n from 1 to 8 and identical or different R, R' alkyls of C1-C5 and/or II) dialdehyde acetals, for the preservation and embalming of human or animal cadavers. No use of a specific composition of polyoxymethylene based on a mixture mainly based on dimers (POME and POMM/E), trimers, tetramers and pentamers or dimers (POME and POMM/E), trimers and tetramers in combination with a biocidel agent, is disclosed or taught.

WO2010/001048 A1 discloses a composition comprising at least one POM with n from 1 to 8 and/or at least one dialdehyde acetal and at least one biocidal agent and, optionally, a pro-penetrating agent for preservation and/or embalming of human or animal bodies. No specific selection of POM is disclosed or taught.

WO2010/116075 A1 describes a composition comprising at least a POM with n from 2 to 8 and a diol of C2-C6 for non-therapeutic use for the preservation and/or embalming of human or animal bodies. No specific selection of POM composition is disclosed or taught.

In the formulation (composition) sought according to the invention, the composition of the polyoxymethylene dialkyl ethers must be free from volatile compounds in order to prevent the emanation of volatile products that present a danger to safety, the environment, hygiene and health upon being handled, and it also must be free from heavy compounds which can affect the fluidity of the composition at low temperatures down to <−10° C. when stored and dissolved in water.

Also, for the composition to be authorized on the European market, the biocidal agent used must be selected from class TP22 of the regulation on biocidal products (RPB, EU regulation No 528/2012) which concerns the placing on the market and the use of biocidel products, which are used to protect humans, animals, materials or articles against harmful organisms, such as vermin and bacteria, by the action of the active substances contained in the biocidal product. Class TP22 refers specifically to fluids used for embalming and taxidermy, wherein active substances are used to disinfect and preserve the whole or certain parts of human or animal cadavers. The biocidal agent used must be without any trace of formaldehyde, while the weight ratio of formaldehyde in the specific mixture of POM used must be less than 1000 ppm by weight (i.e. 1000 mg/kg), preferably less than 500 ppm. The desired composition must have body preservation performances at least equivalent to those obtained with formaldehyde but without the disadvantages of formaldehyde toxicity and without the need to keep the bodies cold.

Biocidal products that are approved or in the process of being approved are identified on the ECHA website (echa.europa.eu/en/information-on-chemicals/biocidal-active-substances). Specifically, the list includes the following products: iodine (CAS: 7553-56-2), bronopol or 2-bromo-2-nitro-1,3-propanediol (CAS 52-51-7), alkyl chloride (C12-C14) dimethyl benzyl ammonium (ADBAC (C12-C14)) (CAS 85409-22-9), alkyl (C12-C18) dimethyl benzyl ammonium chloride (ADBAC (C12-18)) (CAS 68391-01-5 polyvinylpyrrolidone-iodine complex (CAS: 25655-41-8), alkyl (C12-C14) dimethyl (ethylbenzyl) ammonium chloride (ADEBAC (C12-C14)) (CAS 85409-23-0), alkyl chloride (C12-C16), and dimethyl benzyl ammonium (ADBAC/BKC (C12-C16)) (CAS 68424-85-1).

For questions of safety, environment, hygiene and health (i.e. with respect to hazardous volatile compounds and their flammability or explosiveness and with respect to their toxicity) and the fluidity/homogeneity of the low temperature composition, <−10° C., there is a need for a suitable low pouring point adjusted by the removal of heavy POM compounds, and there is also a need for fluid and homogeneous compositions (all components readily soluble in water) at low temperature and without emission of volatile products with, therefore, a) extreme restriction of the level of volatile compounds having a boiling point below 110° C., preferably below 120° C. (measured at atmospheric pressure or 101325 Pa), and b) heavy compounds having a boiling point greater than 130° C., preferably greater than 100° C. under a reduced pressure of 1333 Pa, alternatively greater than 90° C. under a reduced pressure of 100 Pa, preferably greater than 70° C. under a reduced pressure of 100 Pa, in the composition of the POM related to these problems.

In order to overcome the drawbacks of known solutions of the prior art relating to the preservation of the dead human or animal body and/or its embalming, the present invention therefore proposes a formulation free of formaldehyde (for example, a formaldehyde content less than 1000 ppm (mg/kg of POM), preferably less than 500 ppm) based on a specific composition of polyoxymethylene dialkyl ethers (POM) having a restricted specific distribution of n as a function of R and R', the composition comprising in addition to the POM mixture, at least one suitable biocidal agent preferably taken from the TP22 approved biocide class, at least one pro penetrating agent, at least one dye, optionally another additive, and water as a diluent.

The first object of the invention therefore relates to an aqueous composition comprising the specific mixture of polyoxymethylene dialkyl ethers, a biocidal agent, in particular selected from the approved list of biocidal agents without formaldehyde or without formaldehyde liberators (formaldehyde being by definition excluded as a biocidal agent), a pro-penetrating agent, a dye, optionally another additive, and water as a diluent.

Another object of the present invention is a non-therapeutic method for preserving a dead human or animal body and/or embalming a dead body comprising administering to the body a composition as defined according to the present invention.

Another object of the present invention relates to the use of the composition as defined according to the invention, for the preservation of the dead human or animal body and/or for the embalming of the dead body.

The invention also relates to a specific mixture of polyoxymethylene dialkyl ethers (POM).

A final object of the invention is a method of preparation of the mixture of POM of the invention.

COMPOSITION

The first object of the invention relates to an aqueous composition which comprises the following components:
a) a mixture of polyoxymethylene dialkyl ethers (POM) selected from a mixture of compounds of the general formula R—$(OCH_2)_n$—OR',
  with R, R' being identical or different and chosen from methyl and/or ethyl for at least 90 mol %, preferably at least 95 mol % of the total R+R', and the rest of R, R' being identical or different alkyls chosen from among those having 3 to 8 carbons and representing less than 10%, preferably less than 5 mol %, of the total R+R', and provided that:
  a1) when R=R'=methyl, the mixture comprises the 3 compounds with n=3 to 5 or both compounds with n=3 to 4 and the weight of the compounds with n=3 to 5 or n=3 to 4, is at least 95%, preferably at least 99% of the total weight of the mixture and
  a2) when R=R'=ethyl, the mixture comprises the 3 compounds with n=2 to 4 or both compounds with n=2 to 3
  and the weight of the compounds (with n=2 to 4 or n=2 to 3) is at least 95%, preferably at least 99% of the total weight of the mixture
  a3) when R=methyl and R'=ethyl, the mixture comprises the 4 compounds with n=2 to 5 or the 3 compounds with n=2 to 4 and the weight of the compounds (with n=2 to 5 or n=2 at 4) represents at least 95%, preferably at least 99% of the total weight of the mixture,
b) at least one biocidal agent,
c) at least one pro-penetrating agent,
d) at least one dye,
e) optionally, at least one other additive,
and water as a diluent.

More particularly, in the composition according to the invention, the proportion by weight of components a)+b)+c)+d)+e) represents from 0.5 to 30%, preferably from 1 to 25% and more preferably from 1 to 20% of the total weight of said aqueous composition.

In one embodiment, the composition according to the invention does not comprise any compound other than components a)+b)+c)+d)+e) and water.

Preferably, the component a) represents from 20 to 50%, preferably from 30 to 40% by weight with respect to a)+b)+c)+d)+e) from 0.5 to 15%, of preferably from 0.8 to 8% of the total weight of said aqueous composition.

The composition according to the invention comprises a component a) which is a mixture of POM. The mixture of POM may be the mixture of POM according to the invention as defined hereinafter.

According to a first particular option, the component a) is a mixture according to a1) with R=R'=methyl with n=3 to 5 or n=3 to 4.

According to a second particular option, the component a) is a mixture according to a2) with R=R'=ethyl and with n=2 to 4 or with n=2 to 3.

According to a particular option of the composition, the mixture is defined according to a3), with R=methyl and R'=ethyl and with n=2 to 5 or n=2 to 4.

The mixture of POM may be prepared according to the method of preparation of the mixture of POM according to the invention as defined hereinafter.

The POM mixtures according to the invention may be prepared by a process comprising the following steps:
1) Reaction: A mixture of POM, most often methylal and/or ethylal, or even POM of the lower and higher ranks of the previous syntheses (i.e. the distillation heads and feet), and a source of preferably anhydrous formaldehyde, such as trioxane, tetraoxane or paraformaldehyde, is put in contact with an acid catalyst. This can be a Bronsted or Lewis acid. The molar ratio between the alkoxy groups (alcohols) of the starting acetals and the $CH_2O$ units of the formaldehyde sources is preferably between 2/1 and 2/10. To facilitate the dissolution of paraformaldehyde, the addition of sodium or potassium alcoholate, or sodium or potassium hydroxide, can be necessary. The catalysts that are suitable for this reaction are heterogeneous catalysts that are easy to filter at the end of the reaction. Among the catalysts which can be used, mention can be made, in particular, of acid resins such as acid resins of the Amberlyst® and Lewatit® type, Lewis acids of metals such as aluminum, iron, boron, antimony, zinc, tin or titanium, for example $BF_3$, $BF_3$—$OEt_2$, $TiCl_4$, $NbCl_5$, $SnBr_4$, $SnCl_2$, $SnCl_4$, $SbF_5$, $(C_6H_5)_3C+SbF_6$—, $SbCl_5$, $Et_3O+SbCl_6$—), $HZSM_5$ zeolite, HY zeolite, $H_2SO_4$, methanesulfonic acid, paratoluene sulphonic acid, Nafion®, etc. The reaction is carried out at low temperature (i.e. at a temperature below 100° C. and at a pressure between atmospheric pressure and 6.1 bars or 610000 Pa). The reaction is carried out in batch mode or in continuous mode. In the batch configuration, the catalyst is preferably stirred with the solution, but it can also be put in a wire basket, itself rotated in the reactor. In the continuous mode, the catalyst is preferably placed in a fixed bed. The reaction liquid containing the starting acetals or polyacetals (POM) and the formaldehyde source passes through the catalyst bed from top to bottom or from bottom to top. Preferably the liquid flows through the catalyst bed from bottom to top, and the catalyst grains retain mobility in the catalyst bed.
2) Neutralization (optional): The reaction liquid separated from its catalyst is then washed with a sodium hydroxide solution in order to eliminate traces of residual acid. An aqueous solution of sodium hydroxide, or optionally a methanolic solution of sodium hydroxide, sodium or potassium methoxide, a solution of sodium hydroxide in methylal, or anhydrous sodium hydroxide, is used for this purpose. Other bases can be used such as potash, lime, ammonia solution . . . .
3) Evaporation: the raw product obtained systematically contains a distribution of POM of all ranks, i.e. ranks n=1 to infinity, however ranks greater than n=8 are difficult to quantify because of the very low levels obtained. In the synthetic raw product, the POMs of the lower ranks represent the bulk of the mass. Evaporation is necessary to remove the lighter POMs from the synthetic mixture. Since they are light POMs, they can be evaporated at atmospheric pressure, or under reduced pressure at a lower temperature, for example at a temperature below 110° C., preferably below 120° C., at atmospheric pressure, or at an absolute total pressure greater than 27,000 Pa at 70° C., or preferably a total pressure greater than 13500 Pa at a temperature of 50° C. The person skilled in the art can easily select the temperature-pressure pair that corresponds to the molecules that one wishes to evaporate. These light POMs contribute not only to VOC (volatile organic compounds) emissions, but also to solvent odor perceptions, as well as lowering the flash point of the mixture when present in the POM blend. It is therefore necessary to eliminate all or part of it. POMs with lower ranks are, however, good solvents for higher rank POMs. They also solubilize more easily in water. It is therefore necessary to also eliminate the POMs of the higher ranks.

4) Distillation: The head mixture obtained previously is then evaporated under partial vacuum, in order to distil the POMs of the next higher ranks and to keep the heaviest distillation. However, it is necessary not to heat the mixture of POMs at a too high temperature that could degrade it. The distillation is thus carried out under partial vacuum. The vacuum level and the distillation temperature are adjusted to distill the targeted chain length POMs.

5) Heads and feet recycling: Distillation heads and feet in the previous steps can represent significant fractions, greater than 50% by weight (taking into account the methylal and ethylal that must be recycled) and often above 75% by weight of the reaction mixture. These fractions are not lost. They can be used as raw materials for the synthesis of POMs. However, it is important to know the proportions of compounds present in order to adjust better the amount of formaldehyde source required for the reaction. A quantity of formaldehyde is maintained which is calculated as follows: Sum $(n*POM_n)+m*(CH_2O)_m)/(Sum(POM_n)$ with $POM_n$ moles of POM of rank n, $(CH_2O)_m$ is trioxane when m=3 and $(CH_2O)_m$ represents the number of moles of trioxane, m=4 for tetraoxane or paraformaldehyde when m is greater, so that this quantity remains between 2 and 11, preferably between 2 and 4.

6) Analyzes: The product obtained during the syntheses is analyzed by chromatography. The boiling points are also measured to verify that the product is compliant. During this measurement, the product is distilled by varying the vacuum level at constant temperature.

The composition of the invention comprises a biocidal component b).

The biocidal component b) may comprise a biocidal agent selected from the approved list of biocidal agents without formaldehyde or without formaldehyde liberators (formaldehyde being by definition excluded as a biocidal agent).

The biocidal agent b) may comprise a biocidal agent as defined according to Directive no °98/8/CE of Feb. 16, 1998: "any substance or mixture, in the form in which it is supplied to the user, consisting of, containing or generating one or more active substances, with the intention of destroying, deterring, rendering harmless, preventing the action of, or otherwise exerting a controlling effect on, any harmful organism by any means other than mere physical or mechanical action".

In particular, the biocidal component b) may comprise a biocidal agent selected from class TP22 of the regulation on biocidal products (RPB, EU regulation No 528/2012) which concerns the placing on the market and the use of biocidal products, which are used to protect humans, animals, materials or articles against harmful organisms, such as vermin and bacteria, by the action of the active substances contained in the biocidal product. Class TP22 refers specifically to fluids used for embalming and taxidermy, wherein active substances are used to disinfect and preserve the whole or certain parts of human or animal cadavers.

The biocidel component b) can be chosen from: iodine (CAS #7553-56-2); iodinated polyvinylpyrrolidone (polyvinylpyrrolidone-iodine complex) (CAS #25655-41-8); bronopol or 2-bromo-2-nitro-1,3-propanediol (CAS #52-51-7); (C12-C18) alkyl dimethyl benzyl ammonium chloride (ADBAC (C12-18) (CAS #68391-01-5); (C12-C16) alkyl chloride dimethyl benzyl ammonium chloride (ADBAC/BKC (C12-16)) (CAS 68424-85-1); (C12-C14) alkyl dimethyl benzylammonium chloride (ADBAC (C12-14) (CAS #85409-22-9); alkyl (C12-C14) chloride dimethyl ethyl benzyl ammonium (ADEBAC (C12-14) (CAS #85409-23-0); glutaraldehyde (CAS #111-30-8); ethanol (CAS #64-17-5); peracetic acid (CAS #79-21-0) methyl ethyl ketone peroxide (CAS #1338-23-4), butanedial (CAS #638-37-9), diethyl acetal (CAS #105-57-7), glyoxal (107-22-2), and diethylene glycol (CAS #111-46-6), organic acids such as ascorbic acid (CAS #50-81-7) or citric acid (CAS #77-92-9), phenolics such as vanilic aldehyde (CAS #121-33-5), guaiacol (CAS #90-05-1), eugenol (CAS #97-53-0), phenol (CAS #108-95-2), methyl paraben (CAS #99-76-3), propyl paraben (CAS #94-13-3), 1-hexadecylpyridinium chloride (CAS #123-03-5), a compound of the formula $(C_3H_4O)n \cdot (C_3H_4O_2)m$ where n>m such as Chemyde® from Chemeq CAS #(28349-72-6), and mixtures thereof.

More preferably, the biocidel component b) is chosen from among: iodine (CAS #7553-56-2); iodinated polyvinylpyrrolidone (polyvinylpyrrolidone-iodine complex) (CAS #25655-41-8); bronopol (CAS #52-51-7); (C12-C18) alkyl dimethyl benzyl ammonium chloride (ADBAC (C12-18) (CAS #68391-01-5); (C12-C16) alkyl chloride dimethyl benzyl ammonium chloride (ADBAC/BKC (C12-16)) (CAS #68424-85-1); (C12-C14) alkyl dimethyl benzyl ammonium chloride (ADBAC (C12-14) (CAS #85409-22-9); alkyl chloride (C12-C14) dimethyl ethyl benzyl ammonium (ADEBAC (C12-14) (CAS #85409-23-0); glutaraldehyde (CAS #111-30-8); a compound of the formula $(C_3H_4O)_n \cdot (C_3H_4O_2)_m$ where n>m such as Chemyde® from Chemeq, and mixtures thereof.

The composition according to the invention comprises a pro-penetrating component c).

The pro-penetrating component c) may comprise a compound that facilitates the passage of the components of the composition of the invention through the skin barrier.

The pro-penetrating component c) can be chosen from among: propylene glycol (CAS #57-55-6): monoethylene glycol (CAS #107-21-1); glycerol (CAS #56-81-5); propanol-2 (CAS #67-63-0); dimethylsulfoxide (CAS #67-68-5); polyethylene glycol (CAS #25322-68-3); 2-ethoxyethanol (CAS #110-80-5); 2-phenoxyethanol (CAS #122-99-6); tetrahydrofurfuryl alcohol (CAS #97-99-4); a linear or branched C2-C6 monoalcohol; a glycol such as 1,3-propanediol; butanediol-1,4, butanediol-1,3, butanediol-2,3, hexylene glycol; a C8-C22 fatty acid; a cyclodextrin; a surfactant; a C1-C4 alkyl acetate, a mono- or polyester of fatty acid and of glycerol or of propylene glycol, a fatty alcohol ester of lactic acid or of glycolic acid, a fatty acid ester and isopropyl; a C8-C18 fatty alcohol; an azone; an alkyl N,N-dialkylaminoalkanoate; an amide; urea; a urea derivative; a terpene; a terpenoid; methyl or benzyl nicotinate; a sulfoxide; isosorbide; and mixtures thereof.

As used herein, the term "an azone" means azone (1-dodecylazacycloheptan-2-one or laurocaprame) or an azone derivative. An azone derivative is a compound bearing a non-aromatic heterocycle comprising 4 to 6 carbon atoms and at least one nitrogen atom.

As used herein, the term "urea derivative" means a compound comprising a urea bond —NH—C(═O)—NH—.

Preferably, the pro-penetrating component c) is chosen from among: propylene glycol (CAS #57-55-6); monoethylene glycol (CAS #107-21-1); glycerol (CAS #56-81-5); propanol-2 (CAS #67-63-0); dimethylsulfoxide (CAS #67-68-5); and mixtures thereof.

Preferably, the composition comprises:
from 0.5 to 10%, preferably from 0.8 to 8% by weight of component a) relative to the total weight of the aqueous composition
from 0.1 to 3%, preferably from 0.15 to 2% by weight of component b) relative to the total weight of the aqueous composition
from 0.5 to 10%, preferably from 0.8 to 8% by weight of component c) relative to the total weight of the aqueous composition
from 0.1 to 8%, preferably from 0.2 to 5% by weight of component d) relative to the total weight of the aqueous composition.

The composition according to the invention comprises a dye component d).

A dye is a substance that modifies the color of the composition according to the invention. A dye may comprise a chromophore group. The dye may in particular be an azo, anthraquinone, nitroso, indigoic, triarylmethane, xanthene, acridine, thiazine, phthalocyanine, thiazole, oxazine, quinoline or carotene dye.

Preferably, the dye may be soluble in aqueous phase. Even more preferably, the dye is a food dye.

Examples of suitable dyes are eosin, carminic acid, erythrosine, Allure Red AC (or disodium 6-hydroxy-5-[(2-methoxy-5-methyl-4-sulfonatophenyl)diazenyl]naphthalene-2-sulfonate).

The composition according to the invention may optionally comprise an additive component e).

The additive can be selected from: fragrances, in particular a natural or synthetic fragrance, for example flower extracts such as rose (rose oil), lilac, and aromatic esters, preferably with fresh notes like eucalyptus; borax (EC Number 215-540-4); potassium nitrate (CAS #7757-79-1); boric acid (CAS #10043-35-3); sodium citrate (CAS #68-04-2); sodium hexametaphosphate (CAS #10124-56-8); sodium acetate (CAS 127-09-3); hydrochloric acid (CAS #7647-01-0); bis(tributyltin) oxide (CAS #56-35-9); sodium phosphate dibasic (CAS 7558-79-4); sodium phosphate monobasic (CAS #7558-80-7); ethylenediaminetetraacetic acid (EDTA) (CAS #60-00-4); sodium alkylsulfonate (CAS #85711-69-9); potassium carbonate (CAS #584-08-7); trichloroacetaldehyde (CAS #302-17-0); and mixtures thereof.

Method and Uses

The second object of the invention relates to a non-therapeutic method for preserving a human or animal body and/or embalming a dead body, the method comprising the administration to said body of a composition as defined above according to the invention.

According to a particular option of the method of the invention, the composition is injected intra-arterially into the body.

According to another particular option of the method of the invention, the composition is infused into the body.

According to a third particular option of the method of the invention, the composition is applied topically to the body.

A last object covered by the present invention relates to the use of the composition as defined according to the invention, for the preservation of the dead human or animal body, and/or for the embalming of the dead body, or the use for anatornopathology purposes. According to a particular option, the use relates to the preservation of organs, tissues or cells of a living or dead human or animal organism/body, by immersion of said organs, tissues or cells in (or infusion with) the composition as defined above according to the invention, for anatomopathology purposes.

"Anatomopathology" in the context of the invention is the medical specialty which relates to the examination of the organs, tissues or cells of a living or dead human or animal organism/body, in order to identify and analyze abnormalities related to a disease.

More particularly the invention is covering a method of preservation of organs, tissues or cells of a living or dead, human or animal organism/body, comprising the step of immersion of said organs, tissues or cells in the composition of the present invention. More specifically said preservation is for anatomopathology purposes.

More particularly according to this use, the composition is used for the preservation and/or for the embalming of the body according to one of the following methods:
injecting said composition intra-arterially into the body
infusion of said composition into the body
topical application of said composition on the body.

Mixture of POM

The mixture of POM of the invention is a mixture of compounds of general formula $R—(OCH_2)_n—OR'$
with R, R' being identical or different and chosen from methyl and/or ethyl for at least 90 mol %, preferably at least 95 mol %, of the total R+R', and the rest of R, R' being identical or different alkyls chosen from among those having 3 to 8 carbons and representing less than 10%, preferably less than 5 mol %, of the total R+R', and provided that:
a1) when R=R'=methyl, the mixture comprises the 3 compounds with n=3 to 5 or both compounds with n=3 to 4 and the weight of the compounds with n=3 to 5 or n=3 to 4 is at least 95%, preferably at least 99%, of the total weight of the mixture and
a2) when R=R'=ethyl, the mixture comprises the 3 compounds with n=2 to 4 or both compounds with n=2 to 3 and the weight of the compounds with n=2 to 4 or n=2 to 3 is at least 95%, preferably at least 99%, of the total weight of the mixture
a3) when R=methyl and R'=ethyl, the mixture comprises the 4 compounds with n=2 to 5 or the 3 compounds with n=2 to 4 and the weight of the compounds with n=2 to 5 or n=2 at 4 represents at least 95%, preferably at least 99%, of the total weight of the mixture.

According to a first particular option, the mixture of POM of the invention is a mixture according to a1) with R=R'=methyl with n=3 to 5 or n=3 to 4. Such a mixture may respectively be referred to as $POMM_{3-5}$ or $POMM_{3-4}$.

According to a second particular option, the mixture of POM of the invention is a mixture according to a2) with R=R'=ethyl and with n=2 to 4 or with n=2 to 3. Such a mixture may respectively be referred to as $POME_{2-4}$ or $POME_{2-3}$.

According to another particular option, the mixture of POM of the invention is a mixture according to a3), with R=methyl and R'=ethyl and with n=2 to 5 or n=2 to 4. Such a mixture may respectively be referred to as $POMM/E_{2-5}$ or $POMM/E_{2-4}$.

The mixture of POM of the invention is advantageously free of volatile compounds, preferably free of dangerous volatile compounds.

In a preferred embodiment, the mixture of POM of the invention is free of formol. Accordingly, the mixture of POM may comprise less than 1000 ppm of formol (less than 100 mg of formol/kg of mixture of POM).

The mixture of POM of the invention is advantageously free of heavy compounds.

As used herein, the term "volatile compounds" means compounds having a boiling point lower than 110° C. (measured at atmospheric pressure or 101325 Pa).

As used herein, the term "dangerous volatile compounds" means volatile compounds classified as carcinogens, mutagens and/or teratogens, such as for example formol.

As used herein, the term "heavy compounds" means compounds having a boiling point greater than 130° C. under a reduced pressure of 1333 Pa, alternatively greater than 90° C. under a reduced pressure of 100 Pa, preferably greater than 70° C. under a reduced pressure of 100 Pa.

As used herein, the term "mixture (or composition) free of compound X" means a mixture (or a composition) comprising less than 10%, or less than 5%, or less than 2%, or less than 1%, or less than 0.5%, or less than 0.1%, or less than 0.01%, or yet 0%, by weight of compound X based on the weight of the mixture (or of the composition).

Method of Preparation of the Mixture of POM

The mixture of POM of the invention may be prepared by a method comprising the following steps:
a) reaction of an initial mixture of POM and a formaldehyde source in the presence of an acid catalyst, wherein the initial mixture of POM is represented by the general formula $R_1—(OCH_2)_n—OR_1'$
wherein
$R_1$ and $R_1'$, identical or different, are selected from alkyls having 1 to 8 carbon atoms, and
n=1 to infinity;
b) optionally separation of the acid catalyst from the reaction mixture;
c) optionally neutralization of the reaction mixture;
d) evaporation of light POM fraction of general formula $R—(OCH_2)_n—OR'$ with n=1 and/or 2 when R and R'=methyl or with n=1 when R=ethyl and R'=methyl or ethyl;
e) distillation to remove heavy POM fraction of general formula $R—(OCH_2)_n—OR'$ with n>5 when R=methyl and R'=methyl or ethyl or with n>4 when R and R'=ethyl;
f) optionally recycling of the light POM fraction and/or heavy POM fraction in step a).

The initial mixture of POM of step a) may comprise methylal and/or ethylal and optionally recycled POM fractions from step f) (i.e. light POM fraction from step d) and/or heavy POM fraction from step e)).

The formaldehyde source of step a) may in particular be anhydrous. Preferably, the formaldehyde source is selected from trioxane, tetraoxane, paraformaldehyde and mixtures thereof. To facilitate the dissolution of paraformaldehyde, the addition of sodium or potassium alcoholate, or sodium or potassium hydroxide, can be necessary.

Preferably, in step a) the molar ratio between the alkoxy groups (alcohols) of the initial mixture of POM and the —(CH₂O)— units of the formaldehyde source is from 2/1 to 2/10.

The acid catalyst of step a) may be a Bronsted or Lewis acid. Preferably, the acid catalyst is a heterogeneous catalyst. The use of a heterogeneous catalyst advantageously facilitates the separation of the catalyst from the reaction mixture, for example by filtration. Among the catalysts which can be used, mention can be made, in particular, of acid resins such as acid resins of the Amberlyst® and Lewatit® type, Lewis acids of metals such as aluminum, iron, boron, antimony, zinc, tin or titanium, for example $BF_3$, $BF_3—OEt_2$, $TiCl_4$, $NbCl_5$, $SnBr_4$, $SnCl_2$, $SnCl_4$, $SbF_5$, $(C_6H_5)_3C^+SbF_6^-$, $SbCl_5$, $Et_3O^+SbCl_6^-$—, H-ZSM-5 zeolite, HY zeolite, $H_2SO_4$, methanesulfonic acid, paratoluene sulphonic acid and Nafion®.

The reaction of step a) may be carried out at low temperature (i.e. at a temperature below 100° C. and at a pressure between atmospheric pressure and 6.1 bars or 610000 Pa). The reaction of step a) may be carried out in batch mode or in continuous mode. In the batch configuration, the catalyst is preferably stirred with the solution, but it can also be put in a wire basket, itself rotated in the reactor. In the continuous mode, the catalyst is preferably placed in a fixed bed. The reaction liquid containing the initial mixture of POM and the formaldehyde source may pass through the catalyst bed from top to bottom or from bottom to top. Preferably, the liquid flows through the catalyst bed from bottom to top, and the catalyst grains retain mobility in the catalyst bed.

The optional separation step b) may be carried out by filtration or centrifugation when the acid catalyst is dispersed in the reaction mixture. Alternatively, if the acid catalyst is contained in a wire basket, the latter may be simply removed from the reactor. When the reaction is carried out in continuous mode with an acid catalyst in a fixed bed, the separation step is not necessary, as the catalyst remains trapped in the fixed bed.

The optional neutralization step c) may be carried out with a base to eliminate traces of residual acid. The base may be selected from an aqueous solution of sodium hydroxide, a methanolic solution of sodium hydroxide, sodium or potassium methoxide, a solution of sodium hydroxide in methylal, anhydrous sodium hydroxide, potash, lime, and ammonia solution.

The evaporation step d) may be used to remove all or part of the light POM fraction. The light POM fraction is evacuated at the head of the evaporation unit. The evaporation may be carried out with an evaporation unit selected from a rotary evaporator and/or a distillation column. The evaporation may be carried out in a single step or in several successive steps. The evaporation may be carried out at atmospheric pressure or under reduced pressure. For example, the evaporation may be carried out by heating the mixture at a temperature below 120° C., preferably below 110° C., at atmospheric pressure, or by heating at 70° C. under a total pressure greater than 27,000 Pa, or preferably by heating at 50° C. at a total pressure greater than 13,500 Pa. The person skilled in the art can easily select the temperature-pressure pair that corresponds to the fractions that one wishes to evaporate.

The distillation step e) may be used to remove all or part of the heavy POM fraction. The heavy POM fraction remains at the bottom of the distillation unit and the desired POM mixture is isolated at the head of the distillation unit. The distillation may preferably be carried out under partial vacuum. The heating temperature is advantageously kept lower than 120° C. Indeed, heating at a temperature above 120° C. could degrade the mixture of POM. The vacuum level and the distillation temperature are adjusted to distill the targeted chain length POMs.

The recycling step f) may be used to reintroduce the light POM fraction eliminated at step d) and/or the heavy POM fraction at the beginning of the method. The light POM fraction and the heavy POM fraction can represent significant fractions, in particular greater than 50% by weight, and often above 75% by weight of the reaction mixture. These fractions can be used as raw materials for the synthesis of the mixture POM of the invention. However, it is important to know the proportions of compounds present in order to better adjust the amount of formaldehyde source required for the reaction. The required molar quantity of formaldehyde can be calculated as follows:

$$[\text{Sum}(n*POM_n)+m*(CH_2O)_m]/[\text{Sum}(POM_n)]$$

with
$POM_n$=number of moles of POM of rank n
$(CH_2O)_m$=number of moles of the formaldehyde source
n=number of —$(CH_2O)$— units in each POM
m=number of —$(CH_2O)$— units in the formaldehyde source (m=3 for trioxane, m=4 for tetraoxane and m=5 to 100 for paraformaldehyde)
so that this quantity remains between 2 and 11, preferably between 2 and 4.

The following examples are presented to illustrate the invention and its performances and do not limit the scope of its coverage which is defined by the claims below.

EXAMPLES

1) Raw Materials Used

All raw materials used in synthesis and application are presented in the summary table 1 below.

Raw Materials Used in Synthesis and Application Formulation

TABLE 1

| Raw material | Name or chemical nature | Technical function according to the invention |
|---|---|---|
| Synthesis | | |
| Methylal | $CH_3$—$OCH_2$—$OCH_3$ | Raw material |
| Ethylal | $CH_3CH_2OCH_2OCH_2CH_3$ | Raw material |
| Paraformaldehyde | $(CH_2O)_n$ | Raw material |
| Trioxane | $(CH_2O)_3$ | Raw material |
| Amberlyst$^R$ resin | A15 (from Dow/Röhm & Haas) | Catalyst |
| Application formulation | | |
| POMs | R—$(OCH_2)$n-OR' | Component a) see synthesis examples |
| (ADBAC/BKC (C12-16) CAS# 68424-85-1 | Alkyl chloride (C12-16) dimethyl benzyl Ammonium | Biocidal agent b) |
| (ADBAC (C12-14)) CAS#85409-22-9 | Alkyl chloride (C12-14) dimethyl benzyl ammonium | Biocidal agent b) |
| (ADBAC (C12-18)) CAS# 68391-01-5 | Alkyl chloride (C12-18) dimethyl benzyl ammonium | Biocidal agent b) |
| (ADEBAC (C12-14)) CAS# 85409-23-0 | Alkyl chloride (C12-14) dimethyl ethyl benzyl ammonium | Biocidal agent b) |
| Propylene glycol | $CH_2(OH)$—$CH(OH)$—$CH_3$ | Pro-penetrating agent c) |
| Borax | | Additive e) |
| Glycerin | $CH_2(OH)CH(OH)CH_2(OH)$ | Pro-penetrating agent c) |
| Potassium nitrate | $KNO_3$ | Additive e) |
| Dye | Eosin | Dye d) |
| Perfume | Rose essence | Additive e) |

Preparation of POMM (R=R': methyl) and POME (R=R'=ethyl)

Synthesis Example 1: Preparation of $POMM_{2-8}$ (R—$(CH_2O)_n$—OR' with n=2 to 8 and R=R'=Methyl)

100 g of methylal—also called dimethoxymethane—(1.32 mol) and 30 g of trioxane (1 mol) are loaded into a 500 ml double-jacketed Schott reactor equipped with mechanical stirring, a condenser, and a temperature probe, 5 g of Amberlyst® A15 resin, previously washed with methanol and dried under vacuum, are added. The mixture is heated to 50° C. and allowed to react for 1 hour. The reaction mixture is filtered and then washed with 10 g of 15% aqueous sodium hydroxide solution. The methylal is removed by evaporation under reduced pressure (90° C., 650 mbar (65,000 Pa absolute) measured at the evaporator) on a rotary evaporator. 55 g are obtained from a cut $POMM_{2-8}$ ($CH_3$—$(CH_2O)_n$—$OCH_3$ where n is 2 to 8.

The mass distribution of the product obtained is determined by GC analysis as shown in Table 2. The analysis is performed on an Agilent 5890 chromatograph equipped with an Agilent sample changer, a split injector and an FID detector. An OV1701 column (14% cyanopropylmethylmethylpolysiloxane), 30 m in length, 0.25 mm in diameter, with a film thickness of 0.25 μm is used. The split is 46 mL/min, 1 μL is injected, the column pressure is 5 psi (34474 Pa relative), the oven temperature is programmed to 50° C. for 5 minutes, then a ramp of 10° C./min up to 250° C., then maintained for 15 minutes. The temperature of the injector is 200° C., that of the detector 270° C. A satisfactory separation of the products is thus obtained.

Synthesis Example 2: Preparation of $POMM_{3-8}$ with n=3 to 8 and R=R'=Methyl 100 g of methylal (also called dimethoxymethane $CH_3$—$OCH_2$—$OCH_3$) (1.32 mol) and 30 g of trioxane (1 mol) were loaded into a 500 ml jacketed Schott reactor equipped with mechanical stirring, a condenser, and a temperature probe). 5 g of Amberlyst® A15 resin, previously washed with methanol and dried under vacuum, are added. The mixture is heated to 50° C. and allowed to react for 1 hour. The reaction mixture is filtered and then washed with 10 g of 15% aqueous sodium hydroxide solution. The methylal is removed by evaporation under reduced pressure (90° C., 600 mBar (60,000 Pa) measured at the evaporator) on a rotary evaporator, then the $POMM_2$ and the residual water are then removed by vacuum distillation. (Oldershaw type column with 10 trays) operating at a pressure of 200 mBar (20,000 Pa) at 90° C. 32 g of a cut $POMM_{3-8}$ ($CH_3$—$(CH_2O)_n$—$OCH_3$ where n is 3 to 8) are obtained.

The mass distribution of the product obtained is determined by GPC analysis as shown in Table 2.

Synthesis Example 3: Preparation of $POMM_{3-4}$ with n=3 to 4 and R=R'=Methyl On the product of Synthesis Example 2, the distillation cut is collected between 60° C. under 65 mbar (6500 Pa) and 90° C. under 10 mbar (1000 Pa) corresponding to $POMM_{3-4}$ where n is 3-4.

Synthesis Example 4: Preparation of $POMM_{3-5}$ with n=3 to 5 and R=R'=Methyl On the product of Synthesis Example 2, the distillation cut is collected between 60° C. under 65 mbar (6500 Pa) (measured at the column) and 86° C. under 1 mbar (100 Pa) corresponding to $POMM_{3-5}$.

Synthesis Example 5: Preparation of $POME_{2-8}$ with n=2 to 8 and R=R'=Ethyl The procedure is identical to that of Synthesis Example 2 using 137 g of ethylal-diethoxymethane ($CH_3CH_2$—$OCH_2$—$OCH_2CH_3$)— (1.32 mol), 30 g of trioxane (1 mol), and 7 g of Amberlyst® resin A15. After reaction, the catalyst is filtered, the product is neutralized with sodium hydroxide to remove all traces of acid, then the light fractions are evaporated under a partial vacuum of 65 mbar (6500 Pa) at 60° C.

A $C_2H_5$—$(CH_2O)_n$—$C_2H_5$ mixture is obtained with n from 2 to 8 (R=R'=ethyl). The mass distribution of the product obtained is determined by GPC analysis as shown in Table 3.

Synthesis Example 6: Preparation of $POME_{2-4}$, with n=2 to 4 and R=R'=Ethyl On the product of Synthesis Example 5, the distillation cut is collected up to 79° C. under 1 mbar (100 Pa) corresponding to $POME_{3-4}$.

Synthesis Example 7: Preparation of $POME_{2-3}$, with n=2 to 3 and R=R'=Ethyl On the product of Synthesis Example 5, the distillation cut is collected at 79° C. under 13 mbar (1300 Pa) corresponding to $POME_{2-3}$.

Synthesis Example 8: Preparation of a Mixture of Compounds $POMM_{3-5}$ (n=3 to 5 and R=R'=Methyl)+$POMM/E_{2-4}$ (n=2 to 4 and R=R'=Ethyl)+$POMM/E_{2-5}$ (n=2 to 5 and R=Methyl and R'=Ethyl) from a Methylal/Ethylal Reaction Mixture=75/25 in Moles In a 1 L double-jacketed Schott reactor equipped with a mechanical stirrer, a condenser and a temperature probe, 271 g of methylal (3.57 mol), 122 g of ethylal (1.17 mol) and 107 g of trioxane (3.57 mol $CH_2O$). 25 g of Amberlyst® A15 resin, previously washed with methanol and dried under vacuum, are added. The mixture is heated to 50° C. and allowed to react for 1 hour. The reaction mixture is filtered and then washed with 100 g of an aqueous solution of sodium hydroxide at 15% by weight. The product is rectified by evaporation under reduced pressure on a rotary evaporator at 60° C. under 100 mbar (10,000 Pa).

180 g of a mixture of compounds of formula: $CH_3$—$(CH_2O)_n$—$OCH_3$ (n=3 to 8 or $POMM_{3-8}$ (n=3 to 8 and R=R'=methyl) of formula $C_2H_5$—$(CH_2O)_n$—$C_2H_5$ or $POME_{2-8}$ (n=2 to 8 and R=R'=ethyl) and of formula $CH_3$—$(CH_2O)_n$—$OC_2H_5$ $POMM/E_{2-8}$ (n=2 to 8 and R=methyl and R'=ethyl), are obtained.

The product is then vacuum distilled using a scraped film evaporator under a vacuum of 1 mbar (100 Pa) at 90° C. 167 g of a mixture consisting essentially of compounds of formula: $CH_3$—$(CH_2O)_n$—$OCH_3$ (n=3 to 5 or $POMM_{3-5}$ (n=3 to 5 and R=R'=methyl), of formula $C_2H_5$—$(CH_2O)_n$—$C_2H_5$ or $POME_{2-8}$ (n=2 to 4 and R=R'=ethyl) and of formula $CH_3$—$(CH_2O)_n$—$OC_2H_5$ $POMM/E_{2-5}$ (n=2 to 5 and R=methyl and R'=ethyl).

The statistical distribution of the masses of the mixture obtained is determined by GC analysis as shown in Table 4. Table 4 groups the compositions and molecular distributions as a function of n (determined by GPC) for all the POM products prepared in the synthesis examples 1 to 7 described above.

Synthesis Example 9: Preparation of $POMM_{3-4}$ with n=3 to 4 and R=R'=Methyl, by Recycling Distillation Heads and Feet of Synthesis Examples 2 and 3

In a 1 L double-jacketed Schott reactor equipped with a mechanical stirrer, a condenser and a temperature probe, 100 g of methylal (also called dimethoxymethane —$CH_3$—$OCH_2$—$OCH_3$) (1.32 mol) and 30 g of trioxane (1 mol $CH_2O$). The heads of the evaporation of Example 2, i.e. methylal and $POMM_2$, are added after removing the water contained therein by drying over magnesium sulphate. The foot of the distillation of Example 3 is also added.

10 g of Amberlyst A15 resin, previously washed with methanol and dried under vacuum, are added. The mixture is heated to 50° C. and allowed to react for 1 hour. The reaction mixture is filtered and then washed with 10 g of 15% aqueous sodium hydroxide solution. The methylal is removed by evaporation under reduced pressure (90° C., 650 mBar (65,000 Pa) measured at the evaporator) on a rotary evaporator, then the $POMM_2$ and the residual water are then removed by vacuum distillation. (Oldershaw type column with 10 trays) operating at a pressure of 200 mBar (20,000 Pa) at 90° C. 60 g of a cut $POMM_{3-8}$ ($CH_3$—$OCH_2$—$OCH_3$), where n is 3 to 8, are obtained.

On the product obtained, the distillation cut is collected between 60° C. under 65 mbar (6500 Pa) and 90° C. under 10 mbar (1000 Pa) corresponding to $POMM_{3-4}$, where n is 3-4.

POMM Characteristics of Synthesis Examples 1 to 4 and 9

TABLE 2

| Synthesis examples | POMM composition | n = 2 % | n = 3 % | n = 4 % | n = 5 % | n = 3-5 (n = 3-4) % | n < 3 % | n > 5 % |
|---|---|---|---|---|---|---|---|---|
| Synthesis example 1 | $POMM_{2-8}$ | 48 | 33 | 12 | 4 | 49 (45) | 48 | 3 |
| Synthesis example 2 | $POMM_{3-8}$ | | 47 | 29 | 14 | 90 (76) | 0 | 10 |

TABLE 2-continued

| Synthesis examples | POMM composition | n = 2 % | n = 3 % | n = 4 % | n = 5 % | n = 3-5 (n = 3-4) % | n < 3 % | n > 5 % |
|---|---|---|---|---|---|---|---|---|
| Synthesis example 3 | POMM$_{3-4}$ | — | 62 | 37 | 1 | 100 (99) | 0 | 0 |
| Synthesis example 4 | POMM$_{3-5}$ |  | 55 | 32 | 13 | 100 | 0 | 0 |
| Synthesis example 9 | POMM$_{3-4}$ | — | 60 | 38 | 2 | 100 (98) | 0 | 0 |

The %s reported are percent areas of the chromatography peaks comparable to % by weight.

POME Characteristics of Synthesis Examples 5 to 7

TABLE 3

| Synthesis examples | POME composition | n = 2 % | n = 3 % | n = 4 % | n = 5 % | n = 2-4 (n = 2-3) % | n < 2 % | n > 5 % |
|---|---|---|---|---|---|---|---|---|
| Synthesis example 5 | POME$_{2-8}$ | 48 | 30 | 13 | 6 | 91 (78) | 0 | 3 |
| Synthesis example 6 | POME$_{2-4}$ | 56 | 30 | 13 | 1 | 100 (86) | 0 | 0 |
| Synthesis example 7 | POME$_{2-3}$ | 61 | 38 | 1 |  | 100 (99) | 0 | 0 |

The %s reports are percent areas of the chromatography peaks comparable to % by weight.

POMM/POME and POMM/E Blend Characteristics of Synthesis Example 8

TABLE 4

| Synthesis example | POMM, POME and POMM/E composition | n = 2 % | n = 3 % | n = 4 % | n = 5 % | Relative distribution in the respective POMM, POME and POMM/E families |
|---|---|---|---|---|---|---|
| Synthesis example 8 | POMM$_{3-5}$ | 0 | 22 | 11 | 5 | n = 3 to 5: 100% rel<br>n = 3 to 4: 86.8% rel |
|  | POME$_{2-4}$ | 4 | 2 | 1 | 0.3 | n = 2 to 4: 95.9% rel<br>n > 4: 4.1%<br>n = 2 to 3: 82.2% rel |
|  | POMM/E$_{2-5}$ | 27 | 15 | 7 | 2.5 | n = 2 to 5: 100% rel<br>n = 2 to 4: 95.2% rel |

The %s reported are percent areas of the chromatography peaks comparable to % by weight.

Application Examples of Embalming/Preservation Compositions

The application examples were made following the application guide "Transitional Guidance on the Biocidal Products Regulation. Transitional Guidance on Efficacy Assessment for Product; Type 22 Embalming Products, of August 2014", Published by ECHA.

Application Example 1 (Comparative Outside the Invention)

900 g of POMM$_{2-8}$ of Synthesis Example 1 and 100 g of 1,2-propanediol (propylene glycol) are mixed.

200 ml of the mixture diluted in 4.3 liters of water are injected with an electric pump, into the femoral artery of the mortal remains of a woman of 50 kg, then 500 ml of the mixture is injected into a cavity. The total volume drained during arterial injection is 3 liters. The diffusion of the product in the organism is excellent. During the operation, a slight solvent odor is noted by the operators. The skin appears hydrated and supple. After 4 days at room temperature, body preservation is good, and the suppleness and hydration of the skin are maintained.

After 10 days at room temperature, the preservation of the body is good, but it is observed that the skin is dry and rigid, especially in the nose. The product does not meet expectations.

Application Example 2 (Comparative Outside the Invention)

300 ml of POMM$_{2-8}$ as produced according to the Synthesis Example 1 diluted in 7.2 liters of water are injected with an electric pump into the femoral artery of the mortal remains of a man of 80 kg, then 500 ml of POMM-$_{2-8}$ are injected into a cavity. The total volume drained during arterial injection is 6 liters.

After 5 days at room temperature, body preservation is good. After 15 days at room temperature, there is a strong degradation of the body accompanied by unpleasant odors. The product does not meet expectations.

Application Example 3 (According to the Invention)

A mixture of a formulation containing POMM$_{3-5}$ (4.8% by weight) of Synthesis Example 4, propane-1,2-diol (1.2% by weight), biocidal agent, alkyl chloride (C12-16) dimethyl benzyl ammonium (ADBAC/BKC (C12-16)—CAS #68424-85-1 (1.5% wt) glycerin (3.7% by weight), a red-resin dye (2% by weight) and water to complete, are prepared.

A first solution of 1.5 liters of the formulation is prepared in 6 liters of water.

5 liters of the aqueous solution are injected with an electric pump into the femoral artery of a mortal remains of a man of 83 kg, then again 2.5 liters of the solution. Then 500 ml of the formulation (containing the 4.8% by weight POMM) is injected into a cavity. The total volume drained during arterial injection is 6 liters.

After 4 days at room temperature, body preservation is good; no swelling is observed. After 10 days at room temperature, body preservation is good, no odor is detected. After 15 days at room temperature, a dissection is performed by the doctors, the muscles were well colored, no odor. The doctor did not notice any difference with a dead body just deceased. Sampling by doctors of the liver, which was found to be of good quality. The other organs were well preserved. The suppleness of the body gives the appearance of a body not "embalmed" and recent, appreciated for the practical work of surgery.

Conditions of Application Examples 1 to 3

TABLE 5a

| Appli example | Sex | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 1 HI | F | 50 | nr | nr | nr | nr | F/electrical | 4.4% by weight POMM in 4.3 L | 0.5 L | 3 L |
| 2 HI | H | 80 | Average | Average | yes | yes | nr | 4% by weight $POMM_{2-8}$ in 7.2 L | 0.5 L | 6 L |
| 3 | H | 83 | Average | Average | 24 hr | yes | C-D + F-D/ electrical | 7.5 L @ 20% Vol | 0.5 L | 6 L | nr = not reported; HI: outside invention; H: Man; F: Woman; F-D: right femoral; F-G left femoral; C-D: right carotid, C-G: left carotid; /electric: electric pump, /manual: manual pump Results of Application Examples 1 to 3

TABLE 5b

| Appli example | | Observation at treatment | | Observation at 2 days | Observation at 5 days | Observation at 15 days |
|---|---|---|---|---|---|---|
| | | Before | After | | | |
| 1 - HI | Odor | Good | Odor of solvent | Good | Good | Bad |
| | Coloring | Good | Good | Good | Good | Bad |
| | Skin suppleness | Good | Good | Good | Good | Acceptable |
| 2 - HI | Odor | Acceptable | Good - Odor of solvent | Good | Good | Bad |
| | Coloring | Acceptable | Good | Acceptable | Acceptable | Bad |
| | Skin suppleness | Good | Good | Good | Good | Acceptable |
| 3 | Odor | Good | Good | Good | Good | Good |
| | Coloring | Good | Good | Good | Good | Good |
| | Skin suppleness | Good | Good | Good | Good | Good |

Application Example 4 (Comparative, Outside the Invention)

Preparation of a mixture of a formulation containing $POMM_{3-8}$ (9.0% by weight) of Synthesis Example 2, propane-diol-1.2 (1.2% by weight), biocidel agent alkyl chloride (C12-14) dimethyl benzyl ammonium CAS #85409-22-9 (1.5% by weight), borax $Na_2B_4O_7$ (0.4% wt), red dye (2% by weight) and water to complete. It is found that the product of the water-$POMM_{3-8}$ mixture is not clear. When the final mixture is exposed to cold (+1° C.) flakes form which settle in the bottom of the flask. The product is therefore not stable and therefore not in line with expectations.

A first solution of 1.8 liters of the formulation is prepared in 7.2 liters of water.

9 kg of the aqueous solution is injected with a manual pump into the right and left carotid of the mortal remains of a man weighing 60 kg. 500 ml of the pure formulation are then injected in a cavity. The total volume drained during arterial injection is 5 liters.

Conditions of Application Example 4

TABLE 6a

| Appli example | Sex/Age (years) | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 4 HI | H/40 | 60 | Average | Low | 24 hr | yes | C-D + G/ manual | 9 L (at 20% vol) | 0.5 L pure | 5 L |

Preservation after 15 days is not good. There are significant odors (see Table 6b).

Results of Application Example 4

TABLE 6b

| | | Observation at treatment | | Observation | Observation | Observation |
|---|---|---|---|---|---|---|
| | | before | after | at 2 days | at 5 days | at 15 days |
| 4 HI | Odor | Good | Good | Good | Good | Bad |
| | Coloring | Good | Good | Good | Good | Acceptable |
| | Skin suppleness | Good | Good | Good | Good | Good |

Application Example 5 (According to the Invention)

Preparation of a mixture of a formulation containing $POMM_{3-4}$ (4.8% by weight) of Synthesis Example 3, propanediol-1,2 (1.2% by weight), alkyl chloride (C12-18) dimethyl benzyl ammonium (ADBAC (C12-18)) CAS #68391-01-5 (1.5% by weight), potassium nitrate (0.3% by weight) red dye (2% by weight) and water to complete.

A first solution of 1.5 liters of the formulation is prepared in 7.5 liters of water.

6 liters of the aqueous solution are injected with a manual pump into the right carotide of the mortal remains of a woman of 75 kg, then again 3 liters of the solution. 500 ml of the pure formulation are then injected in a cavity. The total volume drained during arterial injection was not reported.

Conditions of Application Example 5

TABLE 7a

| Appli example | Sex/Age (years) | Estimate weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 5 | F/90 | 75 | Average | Average | 24 hr | yes | C-D/ manual | 9 L (at 17% vol) | 0.5 L | nr |

Preservation after 15 days is excellent (see Table 7b).

Results of Application Example 5

TABLE 7b

| Appli Example | | Observation at treatment | | Observation | Observation | Observation |
|---|---|---|---|---|---|---|
| | | Before | After | at 2 days | at 5 days | at 15 days |
| 5 | Odor | Acceptable | Good | Good | Good | Good |
| | Coloring | Acceptable | Good | Acceptable | Acceptable | Acceptable |
| | Skin suppleness | Good | Good | Good | Good | Good |

Application Example 6 (Comparative Outside the Invention)

Preparation of a mixture of a formulation containing $POME_{2-8}$ (6% by weight) of Synthesis Example 5, propanediol-1,2 (1.2% by weight), alkyl chloride (C12-14) dimethyl ethyl benzyl ammonium (ADEBAC (C12-14)) CAS #85409-23-0 (1.5% by weight), perfume (0.1% by weight), glycerin (3% by weight), a red dye (2% by weight) and water to complete. When the product is exposed to cold (+1° C.), a haze is formed, and a material in suspension settles towards the bottom of the flask. The product is therefore not stable and is not in line with expectations.

A first solution of 1.6 liters of the formulation is prepared in 6.4 liters of water.

6 liters of the aqueous solution are injected with an electric pump into the right and left carotid of the mortal remains of a man of 120 kg, then again 2 liters of the solution. Then 1000 ml of the pure formulation is injected in a cavity. The total volume drained during arterial injection is 6 liters.

Conditions of Application Example 6

TABLE 8a

| Appli example | Sex | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 6 HI | H | 120 | strong | average | yes | yes | C-D + G/ electric | 8 L (@ 20% vol) | 1 L | 6 L |

Preservation after 15 days is not acceptable. Color and body flexibility are severely degraded (see Table 8b).

Results of Application Example 6

TABLE 8b

| Appli example | | Observation at treatment before | Observation after | Observation at 2 days | Observation at 5 days | Observation at 15 days |
|---|---|---|---|---|---|---|
| 6 HI | Odor | Good | Good | Good | Good | Acceptable |
| | Coloring | Acceptable | Good | Good | Acceptable | Bad |
| | Skin suppleness | Good | Good | Good | Acceptable | Bad |

Application Example 7 (According to the Invention)

Preparation of a mixture of a formulation containing $POME_{2-4}$ (4.8% by weight) of Synthesis Example 6, propanediol-1,2 (1.2% by weight), alkyl chloride (C12-C16) dimethyl benzyl ammonium (ADBAC/BKC (C12-16)) CAS #68424-85-1 (1.5% by weight), borax (0.5% by weight), red dye (2% by weight) and water to complete.

A first solution of 1.5 liters of the formulation is prepared in 4.5 liters of water.

4 liters of the aqueous solution are injected with a manual pump into the right carotid artery and into the right femoral artery of the mortal remains of a 95 kg woman, then again 2 liters of the solution. 500 ml of the pure formulation are then injected in a cavity. The total volume drained during arterial injection is not reported.

Conditions of Application Example 7

TABLE 9a

| Appli example | Sex/Age (years) | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 7 | F/90 | 95 | Strong | Significant | 48 hr | yes | C-D + F-D/ manual | 6 L (@ 17% vol) | 0.5 L | nr |

Preservation after 15 days is good (see Table 9b).

Results of Application Example 7

TABLE 9b

| Appli example | Characteristic | Observation at treatment before | Observation after | Observation at 2 days | Observation at 5 days | Observation at 15 days |
|---|---|---|---|---|---|---|
| 7 | Odor | Good | Good | Good | Good | Good |
|   | Coloring | Acceptable | Acceptable | Acceptable | Acceptable | Acceptable |
|   | Skin suppleness | Good | Good | Good | Acceptable | Acceptable |

Application Example 8 (According to the Invention)

A mixture of a formulation containing $POME_{2-3}$ (4.8% by weight) of Synthesis Example 7, propane-1,2-diol (1.2% by weight), alkyl chloride ($C_{12}$-$C_{16}$) dimethyl benzyl ammonium (ADBAC/BKC (C12-16)) CAS #68424-85-1 (1.5% by weight), borax (0.5% by weight), red dye (2% by weight) and water to complete.

A first solution of 1.5 liters of the formulation is prepared in 7.5 liters of water.

6 liters of the aqueous solution are injected with a manual pump to the right carotid artery and into the right femoral artery of the mortal remains of a man of 95 kg, then again 3 liters of the solution. Then, 500 ml of the pure formulation are injected in a cavity. The total volume drained during arterial injection has not been reported.

Conditions of Application Example 8

TABLE 10a

| Appli example | Sex | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 8 | H | 95 | Strong | Average | yes | yes | C-D + F-D/ manual | 9 L (@ 17% vol) | 0.5 L | nr |

Preservation of the body after 15 days is good (see table 10b).

Results of Application Example 8

TABLE 10b

| Appli Example | Characteristic | Observation at treatment before | Observation after | Observation at 2 days | Observation at 5 days | Observation at 15 days |
|---|---|---|---|---|---|---|
| 8 | Odor | Good | Good | Good | Good | Good |
|   | Coloring | Acceptable | Acceptable | Acceptable | Acceptable | Acceptable |
|   | Skin suppleness | Good | Acceptable | Acceptable | Acceptable | Acceptable |

Application Example 9 (According to the Invention)

Preparation of a mixture of a formulation containing a mixture of $POMM_{3-5}$, $POME_{2-4}$ and $POMM/E_{2-5}$ (4.8% by weight) of Synthesis Example 8, propane-1,2-diol (1.2% by weight), alkyl chloride (C12-C16) dimethyl benzyl ammonium (ADBAC/BKC ($C_{12-16}$)) CAS #68424-85-1 (1.5% by weight), borax (0.5% by weight), a red dye (2% by weight) and water to complete.

A first solution of 1.5 liters of the formulation is prepared in 7.5 liters of water.

6 liters of the aqueous solution are injected into the right and left carotid artery of the mortal remains of a man, then again 3 liters of the solution. 500 ml of the pure formulation are then injected in a cavity. The total volume drained during arterial injection is 7 liters.

Conditions of Application Example 9

TABLE 11a

| Appli example | Sex | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 9 | H | 90 | Average | Average | yes | yes | C-D + G/ nd | 9 L (@ 17% vol) | 0.5 L | 7 L |

After 15 days, body preservation is good (see Table 11b).

Results of Application Example 9

TABLE 11b

| Appli Example | Characteristic | Observation at treatment Before | Observation at treatment after | Observation at 2 days | Observation at 5 days | Observation at 15 days |
|---|---|---|---|---|---|---|
| 9 | Odor | Acceptable | Acceptable | Acceptable | Acceptable | Acceptable |
|   | Coloring | Bad | Good | Good | Acceptable | Acceptable |
|   | Skin suppleness | Acceptable | Good | Good | Good | Good |

Application Example 10 (According to the Invention)

Preparation of mixture of a formulation containing $POMM_{3-4}$ (4.8% by weight) of Synthesis Example 9, propanediol-1,2 (1.2% by weight) of the alkyl chloride ($C_{12}$-$C_{16}$) dimethyl benzyl ammonium (ADBAC/BKC ($C_{12}$-$C_{16}$)) CAS #68424-85-1 (1.5% by weight), borax (0.5% by weight), red dye (2% by weight) and water to complete.

A first solution of 1.5 liters of the formulation is prepared in 7.5 liters of water.

6 liters of the aqueous solution are injected with a manual pump into the right and left carotid artery of the mortal remains of a man of 80 kg, then again 3 liters of the solution. 500 ml of the pure formulation are then injected in a cavity. The total volume drained during arterial injection is 6 liters.

Conditions of Application Example 10

TABLE 12a

| Appli example | Sex/Age (years) | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 10 | H/90 | 80 | Average | Average | 24 hr | yes | C-D + G/ manual | 9 L (@ 17% vol) | 0.5 L | 6 L |

After 15 days, the body preservation is good (see Table 12b).

Results of Application Example 10

TABLE 12b

| Application example | Characteristic | Observation at treatment before | Observation at treatment after | Observation at 2 days | Observation at 5 days | Observation at 15 days |
|---|---|---|---|---|---|---|
| 10 | Odor | Acceptable | Good | Good | Good | Good |
|  | Coloring | Acceptable | Good | Acceptable | Acceptable | Acceptable |
|  | Skin suppleness | Good | Good | Good | Acceptable | Acceptable |

Application Example 11 (According to the Invention)

Preparation of mixture of a formulation containing $POMM_{3-5}$ (4.8% by weight) of Synthesis Example 4, propanediol-1,2 (1.2% by weight), alkyl chloride ($C_{12}$-$C_{16}$) dimethyl benzyl ammonium (ADBAC/BKC ($C_{12}$-$C_{16}$)) CAS #68424-85-1 (1.5% by weight), glycerin (3.7% by weight), perfume (0.1% by weight), red eosin dye (2% by weight) and water to complete.

A first solution of 2 liters of the formulation is prepared in 10 liters of water.

6 liters of the aqueous solution are injected with a manual pump into the right and left carotid artery of the mortal remains of a woman of 80 kg, then again 4 liters of the solution. 500 ml of the pure formulation are then injected in a cavity. The total volume drained during arterial injection is 9 liters.

Conditions of Application Example 11

TABLE 13a

| Appli example | Sex | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 11 | F | 80 | Strong | Significant | 72 hr | yes | C-D + G/ manual | 12 L (@ 17% vol) | 0.5 L | 9 L |

After 15 days, the body preservation is excellent (see Table 13b).

Results of Application Example 11

TABLE 13b

| Appli example | Characteristic | Observation at treatment before | Observation at treatment after | Observation at 2 days | Observation at 5 days | Observation at 15 days |
|---|---|---|---|---|---|---|
| 11 | Odor | Acceptable | Good | Good | Good | Good |
|  | Coloring | Acceptable | Good | Acceptable | Acceptable | Acceptable |
|  | Skin suppleness | Good | Good | Good | Acceptable | Acceptable |

Application Example 12 (Comparative Outside the Invention)

Preparation of mixture of a formulation containing $POME_{2-8}$ (6% by weight) of Synthesis Example 5, propane-diol-1,2 (1.2% by weight), alkyl chloride ($C_{12}$-$C_{16}$) dimethyl benzyl ammonium (ADBAC/BKC ($C_{12}$-$C_{16}$)) CAS #68424-85-1 (1.5% by weight), glycerin (3.7% by weight), perfume (0.1% by weight), red eosin dye (2% by weight) and water to complete. When the final mixture is exposed to cold (+2° C.) flakes form which settle in the bottom of the flask. The product is therefore not stable and therefore not in line with expectations.

A first solution of 2 liters of the formulation is prepared in 8 liters of water.

6 liters of the aqueous solution are injected with an electric pump into the right carotid artery of the mortal remains of a man of 70 kg, then again 4 liters of the solution. 500 ml of the pure formulation are then injected in a cavity. The total volume drained during arterial injection is 9 liters.

Conditions of Application Example 12

TABLE 14a

| Appli example | Sex/Age (years) | Estimated weight (Kg) | Corpulence | Adiposity lever | Refrigerated body | Whole body | Injection/ C = Carotid; F = Femoral; A = Axillary | Arterial fluid | Cavity treatment | Drainage |
|---|---|---|---|---|---|---|---|---|---|---|
| 12 HI | H | 70 | Average | Low | yes | yes | C-D/ electric | 10 L (@ 20% vol) | 0.5 L | 9 L |

After 15 days, the body preservation is unacceptable. The coloring and suppleness of the body are strongly degraded (see Table 14b).

Results of Application Example 12

TABLE 14b

| Appli example | Characteristic | Observation at treatment before | Observation at treatment after | Observation at 2 days | Observation at 5 days | Observation at 15 days |
|---|---|---|---|---|---|---|
| 12 HI | Odor | Good | Good | Good | Good | Acceptable |
| | Coloring | Acceptable | Acceptable | Acceptable | Acceptable | Bad |
| | Skin suppleness | Bad | Acceptable | Acceptable | Acceptable | Bad |

Application Example 13 (According to the Invention)

Preparation of mixture of a formulation containing $POMM_{2-4}$ (4.8% by weight) of Synthesis Example 6, propanediol-1,2 (1.2% by weight), alkyl chloride ($C_{12}$-$C_{14}$) dimethyl ethyl benzyl ammonium (ADEBAC ($C_{12}$-$C_{14}$)) CAS #85409-23-0 (1.5% by weight), glycerin (3% by weight), borax (0.4% by weight), perfume (0.1% by weight), potassium nitrate (0.3% by weight), red eosin dye (2% by weight) and water to complete.

A first solution of 1.5 liters of the formulation is prepared in 7.5 liters of water.

7 liters of the aqueous solution are injected with an electric pump into the right and left carotid artery of the mortal remains of a man of 100 kg, then again 3 liters of the solution. 500 ml of the pure formulation are then injected in a cavity. The total volume drained during arterial injection is 6 liters.

Conditions of Application Example 13

TABLE 15a

| Appli example | Sex | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 13 | H | 100 | Average | Average | 48 hr | yes | C-D + G/ electric | 10 L (@ 20% vol) | 0.5 L | 6 L |

After 15 days, the body preservation is excellent (see Table 15b).

Results of Application Example 13

TABLE 15b

| Appli example | Characteristic | Observation at treatment before | Observation after | Observation at 2 days | Observation at 5 days | Observation at 15 days |
|---|---|---|---|---|---|---|
| 13 | Odor | Acceptable | Good | Good | Good | Good |
|  | Coloring | Acceptable | Acceptable | Acceptable | Acceptable | Acceptable |
|  | Skin suppleness | Good | Good | Good | Acceptable | Acceptable |

Application Example 14 (Outside of the Invention)

Preparation of mixture of a formulation containing $POME_{3-8}$ (9% by weight) of Synthesis Example 2, propanediol-1,2 (1.2% by weight), alkyl chloride ($C_{12}$-$C_{14}$) dimethyl ethyl benzyl ammonium (ADEBAC ($C_{12}$-$C_{14}$)) CAS #85409-23-0 (1.5% by weight), glycerin (3% by weight), borax (0.4% by weight), perfume (0.1% by weight), potassium nitrate (0.3% by weight), red eosin dye (2% by weight) and water to complete. When the final mixture is exposed to cold (+1° C.) flakes form which settle in the bottom of the flask. The product is therefore not stable and therefore not in line with expectations.

A first solution of 1.5 liters of the formulation is prepared in 7.5 liters of water.

6 liters of the aqueous solution are injected with a manual pump into the right femoral artery of the mortal remains of a woman of 60 kg, then again 3 liters of the solution. 500 ml of the pure formulation are then injected in a cavity. The total volume drained during arterial injection is 7 liters.

Conditions of Application Example 14

TABLE 16a

| Appli example | Sex | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 14 HI | F | 60 | Average | Average | no | yes | F-D/ manual | 9 L (@ 17% vol) | 0.5 L | 7 L |

After 15 days, the body preservation is unacceptable. The coloring and body suppleness are strongly degraded (see Table 16b).

Results of Application Example 14

TABLE 16b

| Appli example | Characteristic | Observation at treatment before | Observation after | Observation at 2 days | Observation at 5 days | Observation at 15 days |
|---|---|---|---|---|---|---|
| 14 HI | Odor | Acceptable | Acceptable | Acceptable | Acceptable | Acceptable |
|  | Coloring | Acceptable | Acceptable | Acceptable | Acceptable | Bad |
|  | Skin suppleness | Acceptable | Acceptable | Acceptable | Acceptable | Bad |

Application Example 15 (Outside of the Invention)

Preparation of mixture of a formulation containing POMM$_{2-8}$ (4.8% by weight) of Synthesis Example 1, propanediol-1,2 (1.2% by weight), alkyl chloride ($C_{12}$-$C_{16}$) dimethyl benzyl ammonium (ADBAC/BKC ($C_{12}$-$C_{16}$)) CAS #68424-85-1 (1.5% by weight), glycerin (3.7% by weight), red eosin dye (2% by weight) and water to complete. When the final mixture is exposed to cold (+1° C.) flakes form which settle in the bottom of the flask. The product is therefore not stable and therefore not in line with expectations.

A first solution of 3 liters of the formulation is prepared in 12 liters of water.

6 liters of the aqueous solution are injected with a manual pump into the left and right carotid artery of the mortal remains of a man of 80 kg, then again 6 liters of the solution. 500 ml of the pure formulation (containing POMM at 4.8% by weight) are then injected in a cavity. The total volume drained during arterial injection is 9 liters.

Conditions of Application Example 15

TABLE 17a

| Appli example | Sex | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 15 HI | H | 80 | Average | Average | 24 hr | yes | C-D + G/ manual | 12 L (@ 17% vol) | 0.5 L | 9 L |

After 5 days at room temperature, the body preservation is acceptable, no swelling is observed. After 10 days at room temperature, the body preservation is still acceptable After 15 days, the body preservation is unacceptable. The coloring and body suppleness are strongly degraded (see Table 17b).

Results of Application Example 15

TABLE 17b

| Appli example | Characteristic | Observation at treatment before | Observation at treatment after | Observation at 2 days | Observation at 5 days | Observation at 15 days |
|---|---|---|---|---|---|---|
| 15 HI | Odor | Acceptable | Acceptable | Acceptable | Acceptable | Acceptable |
| | Coioring | Acceptable | Good | Acceptable | Acceptable | Bad |
| | Skin suppleness | Good | Good | Good | Acceptable | Bad |

Application Example 16 (Outside of the Invention)

Preparation of mixture of a formulation containing POMM$_{2-8}$ (4.8% by weight) of Synthesis Example 1, propanediol-1,2 (1.2% by weight), alkyl chloride (C12-18) dimethyl benzyl ammonium (ADBAC (C12-18)) CAS #68391-01-5 (1.5% by weight), potassium nitrate (0.3% by weight), red eosin dye (2% by weight) and water to complete. When the final mixture is exposed to cold (+1° C.) flakes form which settle in the bottom of the flask. The product is therefore not stable and therefore not in line with expectations.

A first solution of 1.5 liters of the formulation is prepared in 7.5 liters of water.

6 liters of the aqueous solution are injected into the left and right carotid artery of the mortal remains of a man of 85 years and 75 kg, then again 3 liters of the solution. 500 ml of the pure formulation are then injected in a cavity. The total volume drained during arterial injection is 5 liters.

Conditions of Application Example 16

TABLE 18a

| Appli example | Sex | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 16 HI | H/85 | 75 | Lean | Low | 24 hr | yes | C-D + G | 9 L (@ 17% vol) | 0.5 L | 5 L |

After 15 days, the body preservation is unacceptable. The coloring and body suppleness are strongly degraded (see Table 18b).

Results of Application Example 16

TABLE 18b

| Appli example | Characteristic | Observation at treatment before | Observation at treatment after | Observation at 2 days | Observation at 5 days | Observation at 15 days |
|---|---|---|---|---|---|---|
| 16 HI | Odor | Good | Good | Good | Good | Acceptable |
| | Coloring | Acceptable | Acceptable | Acceptable | Acceptable | Bad |
| | Skin suppleness | Acceptable | Acceptable | Acceptable | Acceptable | Bad |

Application Example 17 (Outside of the Invention)

Preparation of mixture of a formulation containing $POMM_{2-8}$ (4.8% by weight) of Synthesis Example 1, propanediol-1,2 (1.2% by weight), alkyl chloride ($C_{12}$-$C_{16}$) dimethyl benzyl ammonium (ADBAC/BKC ($C_{12}$-$C_{16}$)) CAS #68424-85-1 (1.5% by weight), borax (0.5% by weight), red eosin dye (2% by weight) and water to complete. When the final mixture is exposed to cold (+1° C.) flakes form which settle in the bottom of the flask. The product is therefore not stable and therefore not in line with expectations.

A first solution of 1.5 liters of the formulation is prepared in 7.5 liters of water.

6 liters of the aqueous solution are injected with a manual pump into the right carotid artery and right femoral artery of the mortal remains of a man of 60 kg, then again 3 liters of the solution. 500 ml of the pure formulation are then injected in a cavity. The total volume drained during arterial injection was not reported.

Conditions of Application Example 17

TABLE 19a

| Appli example | Sex/Age (years) | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 17 HI | H | 60 | Lean | Low | 48 hr | yes | C-D + F-D/ manual | 9 L (@ 17% vol) | 0.5 L | nr |

After 15 days, the body preservation is unacceptable. The coloring and body suppleness are strongly degraded (see Table 19b).

Results of Application Example 17

TABLE 19b

| Appli example | Characteristic | Observation at treatment before | after | Observation at 2 days | Observation at 5 days | Observation at 15 days |
|---|---|---|---|---|---|---|
| 17 HI | Odor | Good | Acceptable | Acceptable | Acceptable | Acceptable |
|  | Coloring | Acceptable | Acceptable | Acceptable | Acceptable | Bad |
|  | Skin suppleness | Acceptable | Acceptable | Acceptable | Acceptable | Bad |

Application Example 18 (Outside of the Invention)

Preparation of mixture of a formulation containing $POMM_{2-8}$ (4.8% by weight) of Synthesis Example 1, propanediol-1,2 (1.2% by weight), alkyl chloride ($C_{12}$-$C_{16}$) dimethyl benzyl ammonium (ADBAC/BKC ($C_{12}$-$C_{16}$)) CAS #68424-85-1 (1.5% by weight), glycerin (3.7% by weight), perfume (0.1% by weight), red eosin dye (2% by weight) and water to complete. When the final mixture is exposed to cold (+1° C.) flakes form which settle in the bottom of the flask. The product is therefore not stable and therefore not in line with expectations.

A first solution of 1 liter of the formulation is prepared in 5 liters of water.

4 liters of the aqueous solution are injected with a manual pump into the left and right carotid artery of the mortal remains of a woman of 50 kg, then again 2 liters of the solution. 500 ml of the pure formulation are then injected in a cavity. The total volume drained during arterial injection is 4 liters.

Conditions of Application Example 18

TABLE 20a

| Appli example | Sex | Estimated weight (Kg) | Corpulence | Adiposity level | Refrigerated body | Whole body | Injection/ C = Carotid; F = Femoral; A = Axillary | Arterial fluid | Cavity treatment | Drainage |
|---|---|---|---|---|---|---|---|---|---|---|
| 18 HI | F | 50 | Lean | Low | 48 hr | yes | C-D + G/ manual | 6 L (@ 17% vol) | 0.5 L | 4 L |

After 15 days, the body preservation is unacceptable. The coloring and body suppleness are strongly degraded (see Table 20b).

Results of Application Example 18

TABLE 20b

| Appli example | Characteristic | Observation at treatment before | after | Observation at 2 days | Observation at 5 days | Observation at 15 days |
|---|---|---|---|---|---|---|
| 18 HI | Odor | Acceptable | Acceptable | Acceptable | Acceptable | Acceptable |
|  | Coloring | Acceptable | Acceptable | Acceptable | Acceptable | Bad |
|  | Skin suppleness | Acceptable | Acceptable | Acceptable | Acceptable | Bad |

The invention claimed is:

1. Aqueous composition comprising the following components:
   a) a mixture of polyoxymethylene dialkyl ethers (POM) selected from a mixture of compounds of the general formula R—(OCH$_2$)$_n$—OR', with R,R' being identical or different and chosen from methyl and/or ethyl for at least 90 mol % of the total R+R' and the rest of R,R' being identical or different alkyls chosen from among those having 3 to 8 carbons and representing less than 10 mol % of the total R+R', and provided that:
      a1) when R=R'=methyl, the mixture comprises 3 compounds with n=3 to 5 or 2 compounds with n=3 to 4, and the weight of these a1) compounds represents at least 95% of the total weight of the mixture,
      a2) when R=R'=ethyl, the mixture comprises 3 compounds with n=2 to 4 or 2 compounds with n=2 to 3, and the weight of these a2) compounds is at least 95% of the total weight of the mixture, and
      a3) when R=methyl and R'=ethyl, the mixture comprises 4 compounds with n=2 to 5 or 3 compounds with n=2 to 4, and the weight of these a3) compounds represents at least 95 of the total weight of the mixture,
   b) at least one biocidal agent
   c) at least one pro-penetrating agent
   d) at least one dye,
   e) optionally, at least one other additive and water as diluent.

2. Composition according to claim 1, wherein the proportion by weight of components a)+b)+c)+d)+e) represents from 0.5 to 30% of the total weight of the aqueous composition.

3. Composition according to claim 1, wherein the component a) represents from 20 to 50% by weight with respect to a)+b)+c)+d)+e), and from 0.5 to 15% of the total weight of the aqueous composition.

4. Composition according to claim 1, wherein the component a) is a mixture according to a1) with R=R'=methyl with n=3 to 5 or n=3 to 4.

5. Composition according to claim 1, wherein the component a) is the mixture according to a2) with R=R'=ethyl and with n=2 to 4 or with n=2 to 3.

6. Composition according to claim 1, wherein the mixture is according to a3), with R=methyl and R'=ethyl and with n=2 to 5 or n=2 to 4.

7. Composition according to claim 1, wherein the biocidal component b) is selected from: iodine, polyvinylpyrrolidone iodine (polyvinylpyrrolidone-iodine complex), bronopol or 2-bromo-2-nitro-1,3 propylene glycol, alkyl chloride (C12-C18) dimethylbenzylammonium (ADBAC C12-18), alkyl chloride (C12-C16) dimethylbenzylammonium (ADBAC/BKC C12-16), alkyl chloride (C12-C14) dimethylbenzylammonium (ADBAC C12-14); alkyl chloride (C12-C14) dimethyl ethyl benzyl ammonium (ADEBAC C12-14), glutaraldehyde; ethanol, peracetic acid, methyl ethyl ketone peroxide, butanedial, diethylacetal, glyoxal, diethylene glycol, organic acids such as ascorbic acid or citric acid, phenolics such as vanilic aldehyde, guaiacol, eugenol, phenol, methylparaben, propylparaben 1-hexadecylpyridinium chloride, a compound of the formula (C$_3$H$_4$O)n·(C$_3$H$_4$O$_2$)m where n>m, and mixtures thereof.

8. Composition according to claim 1, wherein the biocidal component b) is chosen from: iodine, polyvinylpyrrolidone iodine (polyvinylpyrrolidone-iodine complex), bronopol, alkyl chloride (C12-C18) dimethylbenzylammonium (ADBAC C12-18), alkyl chloride (C12-C16) dimethyl benzyl ammonium (ADBAC/BKC C12-16), alkyl chloride (C12-C14) dimethyl benzyl ammonium chloride (ADBAC C12-14), alkyl chloride (C12-C14) dimethyl ethyl benzyl ammonium (ADEBAC C12-14), glutaraldehyde, a compound of formula (C$_3$H$_4$O)n·(C$_3$H$_4$O$_2$)m where n>m, and mixtures thereof.

9. Composition according to claim 1, wherein the pro-penetrating component c) is chosen from: propylene glycol, monoethylene glycol, glycerol, propanol-2, dimethyl sulfoxide, polyethylene glycol, 2-ethoxyethanol, 2 phenoxyethanol, tetrahydrofurfuryl alcohol, linear or branched C$_2$-C$_6$ monoalcohol; a glycol such as 1,3-propanediol, 1,4-butanediol, 1,3-butanediol, 2,3-butanediol, hexylene glycol; a C$_8$-C$_{22}$ fatty acid; a cyclodextrin; a surfactant; C$_1$-C$_4$ alkyl acetate; a mono- or polyester of fatty acid and glycerol or propylene glycol; a fatty alcohol ester of lactic acid or glycolic acid; an ester of fatty acid and isopropyl; a C$_8$-C1$_8$ fatty alcohol; an azone; an alkyl N,N-dialkylaminoalkanoate; an amide, urea; a urea derivative; a terpene; a terpenoid; methyl or benzyl nicotinate; a sulfoxide; isosorbide; and mixtures thereof.

10. Composition according to claim 1, wherein the pro-penetrating component c) is selected from propylene glycol, monoethylene glycol, glycerol, propanol-2, dimethylsulfoxide, and mixtures thereof.

11. Composition according to claim 1, wherein it comprises:
   0.5 to 10% by weight of component a) relative to the total weight of the aqueous composition,
   from 0.1 to 3% by weight of component b) relative to the total weight of the aqueous composition
   from 0.5 to 10% by weight of component c) relative to the total weight of the aqueous composition
   from 0.1 to 8% by weight of component d) relative to the total weight of the aqueous composition.

12. Composition according to claim 1, wherein it comprises in addition to at least one other additive selected from: fragrances, in particular a natural or synthetic fragrance, for example flower extracts such as rose (rose oil), lilac, and aromatic esters, preferably with fresh notes like eucalyptus; borax; potassium nitrate; boric acid; sodium citrate; sodium hexametaphosphate; sodium acetate; hydrochloric acid; bis(tributyltin) oxide; sodium phosphate dibasic; sodium phosphate monobasic; ethylenediamine tetracetic acid (EDTA), sodium alkylsulfonate; potassium carbonate; trichloroacetaldehyde; and mixtures thereof.

13. Composition according to claim 1, wherein:
   when a1) is applicable, the weight of the a1) compounds represents at least 99% of the total weight of the mixture;
   when a2) is applicable, the weight of the a2) compounds represents at least 99% of the total weight of the mixture; and
   when a3) is applicable, the weight of the a3) compounds represents at least 99% of the total weight of the mixture.

14. A mixture of compounds of general formula R—(OCH$_2$)$_n$—OR' with R, R' being identical or different and chosen from methyl and/or ethyl for at least 90 mol % of the total R+R', and the rest of R, R' being identical or different alkyls chosen from among those having 3 to 8 carbons and representing less than 10 mol %, of the total R+R', and provided that:
   a1) when R=R'=methyl, the mixture comprises 3 compounds with n=3 to 5 or 2 compounds with n=3 to 4, and the weight of these a1) compounds is at least 95% of the total weight of the mixture and a2) when R=R'=ethyl, the mixture comprises 3 compounds with n=2 to 4 or 2 compounds with n=2 to 3, and the weight of these a2) compounds is at least 95% of the total weight of the mixture a3) when R=methyl and R'=ethyl, the mixture comprises 4 compounds with n=2 to 5 or 3 compounds with n=2 to 4, and the weight of these a3) compounds represents at least 95% of the total weight of the mixture.

15. A method of preparation of a mixture of compounds, the process comprising the following steps:
- a) reaction of an initial mixture of POM and a formaldehyde source in the presence of an acid catalyst, wherein the initial mixture of POM is represented by the general formula $R_1$—$(OCH_2)_n$—$OR_1'$
  wherein
  $R_1$ and $R_1'$, identical or different, are selected from alkyls having 1 to 8 carbon atoms, and
  n=1 to infinity;
- b) optionally separation of the acid catalyst from the reaction mixture;
- c) optionally neutralization of the reaction mixture;
- d) evaporation of light POM fraction of general formula R—$(OCH_2)_n$—OR' with n=1 and/or 2 when R and R'=methyl or with n=1 when R=ethyl and R'=methyl or ethyl;
- e) distillation to remove heavy POM fraction of general formula R—$(OCH_2)_n$—OR' with n>5 when R=methyl and R'=methyl or ethyl or with n>4 when R and R'=ethyl;
- f) optionally recycling of the light POM fraction and/or heavy POM fraction in step a), and
  wherein said prepared mixture of compounds, which is also of general formula R—$(OCH_2)_n$—OR', has R, R' of the prepared mixture of compounds being identical or different and chosen from methyl and/or ethyl for at least 90 mol % of the total R+R', and the rest of R, R' of the prepared mixture of compounds being identical or different alkyls chosen from among those having 3 to 8 carbons and representing less than 10% of the total R+R', and provided that:
  - (i) when R=R'=methyl, the prepared mixture comprises 3 compounds with n=3 to 5 or 2 compounds with n=3 to 4, and the weight of these (i) compounds is at least 95% of the total weight of the mixture,
  - (ii) when R=R'=ethyl, the prepared mixture comprises 3 compounds with n=2 to 4 or 2 compounds with n=2 to 3, and the weight of these (ii) compounds is at least 95% of the total weight of the mixture, and
  - (iii) when R=methyl and R'=ethyl, the prepared mixture comprises 4 compounds with n=2 to 5 or 3 compounds with n=2 to 4, and the weight of these (iii) compounds represents at least 95%, of the total weight of the mixture.

16. The mixture according to claim 14, wherein:

when a1) is applicable, the weight of the a1) compounds represents at least 99% of the total weight of the mixture;

when a2) is applicable, the weight of the a2) compounds represents at least 99% of the total weight of the mixture; and when a3) is applicable, the weight of the a3) compounds represents at least 99% of the total weight of the mixture.

* * * * *